(12) United States Patent
Talley et al.

(10) Patent No.: US 9,357,468 B1
(45) Date of Patent: May 31, 2016

(54) SMALL CELL HANDOVER TECHNIQUE BASED ON SPEED

(71) Applicant: Sprint Spectrum L.P., Overland Park, KS (US)

(72) Inventors: Ryan S. Talley, Overland Park, KS (US); Kyle C. Allen, Overland Park, KS (US); Nicolas A. Nehme Antoun, Olathe, KS (US); Muralidhar Malreddy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 166 days.

(21) Appl. No.: 13/964,410

(22) Filed: Aug. 12, 2013

(51) Int. Cl.
*H04W 36/32* (2009.01)

(52) U.S. Cl.
CPC ..................... *H04W 36/32* (2013.01)

(58) Field of Classification Search
None
See application file for complete search history.

(56) References Cited

U.S. PATENT DOCUMENTS

| | | | |
|---|---|---|---|
| 6,480,716 B2* | 11/2002 | Salonaho | G01S 11/06 370/331 |
| 7,277,710 B1* | 10/2007 | Jones et al. | 455/456.1 |
| 8,019,296 B1* | 9/2011 | Durig | 455/127.4 |
| 2004/0143386 A1* | 7/2004 | Yoshihara et al. | 701/201 |
| 2004/0185863 A1* | 9/2004 | Ogami | 455/452.1 |
| 2008/0096582 A1* | 4/2008 | Ono et al. | 455/456.2 |
| 2008/0117884 A1* | 5/2008 | Ishii et al. | 370/338 |
| 2009/0247162 A1* | 10/2009 | Yasuoka et al. | 455/436 |
| 2013/0053038 A1* | 2/2013 | Lee | H04W 36/32 455/436 |
| 2015/0017924 A1* | 1/2015 | Worrall et al. | 455/67.11 |

OTHER PUBLICATIONS

Saleh, Areej, A Location-aided Decision Algorithm for Handoff Across Heterogeneous Wireless Overlay Networks, 2004.

* cited by examiner

*Primary Examiner* — Chirag Shah
*Assistant Examiner* — Rina Pancholi

(57) ABSTRACT

A method and corresponding system is provided to help strike a balance between alleviating load among macro cells and reducing excessive signaling when UEs travel through small cells. In one embodiment of the method, a UE may function to receive an indication of the size of a coverage area, calculate current speed, determine that the calculated speed exceeds a threshold speed, and responsively hand over to a different coverage area. In another embodiment of the method, a RAN entity may function to estimate of the size of a coverage area, receive an indication of the current speed of a UE traveling through the coverage area, determine that the calculated speed exceeds a threshold speed, and responsively instruct the UE to hand over to a different RAN. Other examples are possible.

10 Claims, 9 Drawing Sheets

SMALL CELL HANDOVER TECHNIQUE BASED ON SPEED

BACKGROUND

In typical cellular wireless communication systems, wireless communication devices (e.g., cell phones, personal digital assistants, laptops, netbooks, tablets, and/or other wirelessly equipped devices, any of which may be referred to as a user equipment device (UE) for brevity) subscribe to service from a given cellular wireless service provider. In practice, a service provider will operate one or more networks (sometimes referred to as radio access networks (RANs)) including base stations that radiate to define one or more wireless coverage areas, referred to as sectors, where the subscriber UEs can operate.

Through each base station (and corresponding RAN), a UE can obtain connectivity to other networks such as the public switched telephone network (PTSN) and the Internet. Further, each RAN may include one or more radio network controllers (RNCs), or the like, which may be integrated with or otherwise in communication with the base stations, and which may include or be in communication with a switch or gateway that provides connectivity with one or more transport networks. Conveniently with this arrangement, a UE that is positioned within coverage of the RAN may communicate with a base station and in turn, via the base station, with other served devices or with other entities on the transport network.

Generally, wireless communications between a given UE and a serving base station in a RAN are carried out in accordance with one or more air interface protocols that define a mechanism for wireless exchange of information between the UE and the base station. Typically, an air interface protocol will define a "downlink" encompassing communications from the base station to the UE and a "uplink" encompassing communications from the UE to the base station. Further, each of these links may be structured to define particular channels on which certain types of data may be transmitted. These channels may be defined through the use of various mechanisms, including for example, time division multiplexing, code division multiplexing (e.g., spread-spectrum modulation), frequency division multiplexing, as well as others.

The downlink, for example, may define (i) a pilot channel on which the RAN may broadcast a pilot signal to allow UEs to detect wireless coverage, (ii) system parameter channels (e.g., an overhead channel) on which the RAN may broadcast system operational parameters for reference by UEs so that the UE can then seek network access, (iii) paging channels on which the RAN may broadcast page messages to alert UEs of incoming communications, and (iv) traffic channels on which the RAN may transmit bearer traffic (e.g., application data) for receipt by UEs. And the uplink, for example, may define (i) control channels on which UEs may transmit registration messages and call origination requests, and (ii) traffic channels on which UEs may transmit bearer traffic for receipt by the RAN.

Overview

To help alleviate load in a wireless communication system (and perhaps for other reasons), some wireless service providers provide supplementary coverage devices (e.g., femtotcells, picocells, microcells, or another type of device) that radiate to define additional coverage areas in which subscriber UEs can access the service provider's network. Typically, but not always, these devices are located in residential or high-traffic areas and radiate to define coverage areas that are sized smaller than the other coverage areas of the system.

By way of example, a supplementary coverage device may radiate to define a coverage area that is on the order of about 50-500 feet in diameter (depending on the type of device), whereas a traditional base station may radiate to define a coverage area that is on the order of about one or more miles (depending on the environment). For brevity, the supplementary coverage devices and their corresponding coverage areas are generally referred to as "small cells," whereas the traditional base stations and their corresponding coverage areas are generally referred to as "macro cells."

In wireless communication systems that utilize small cells, UEs are typically arranged to prefer those small cells over the macro cells. That is, when a UE is located in an area in which the UE is able to access both a macro cell and a small cell, the UE may prefer to access the small cell in an effort to help alleviate load in the macro cell. One way a UE may be arranged to prefer small cells is by provisioning the UE with a neighbor scan list (or other mechanism) that lists small cells with a higher scanning priority than macro cells (or otherwise instructs the UE to use a particular small cell before the macro cell), but other ways are possible as well.

Although such an arrangement may alleviate load among macro cells of a wireless communication system, it may also lead to excess signaling among the small cells caused by traveling UEs. For instance, in accordance with the small-cell operating preference mentioned above, as a UE travels through a cluster of small cells it may repeatedly hand over from small cell to small cell. To effect each handover from a source small cell to a target small cell, the UE may exchange a series of access messages (or another type of registration or location-update signaling) with the target small cell. Depending on how many UEs pass through a given small cell (as well as how fast those UEs are traveling), the resultant registration signaling at the given small cell may lead to undesirable congestion and, ultimately, a poor user experience.

To address this situation, and perhaps others, disclosed herein is a method that is designed to help strike a balance between alleviating load among macro cells and reducing excessive registration signaling when UEs travel through small cells. In accordance with the method, when a UE is receiving service from a serving base station in a particular coverage area, it may receive from that serving base station an indication of the size of the particular coverage area. The UE may also calculate its current speed. The UE may then determine that the calculated speed exceeds a threshold speed that may be based on the size of the coverage area, and in response to this determination, the UE may hand over from the serving base station to second base station of which the UE is currently in coverage.

In one example embodiment, the serving base station (and the particular coverage area) is a small cell and the second base station (and a corresponding coverage area) is a macro cell of which the UE is currently in coverage. In this embodiment, handing over from the small cell to the macro cell when the UE is traveling at a particular speed may help to mitigate excess registration signaling in which the UE would have engaged with other nearby small cells. Other advantages are possible as well.

After the UE hands over to the second base station, the UE may from time to time enter into new coverage areas (whether they are macro cells or small cells). Thus, in some additional embodiments of the method, when the UE enters into a new coverage area it may repeat the process set forth above. In particular, when the UE enters into a new coverage area in which the UE is currently not receiving service, the UE may receive from the base station in the new coverage area an indication of the size of the new coverage area. The UE may also calculate its current speed again. In some embodiments of the method, as a result of this new calculation, the UE may determine that the calculated speed exceeds a threshold speed that is based on the size of the new coverage area. And in response to this determination, the UE may travel through the new coverage area without handing over to the new RAN entity. In one example embodiment, the new RAN entity (and new coverage area) is a small cell. Thus, traveling through the small cell without handing over to the small cell may help to mitigate any excess registration signaling in which the UE would have engaged with that small cell. Other advantages are possible as well.

Alternatively, in some other embodiments of the method, as a result of this new calculation, the UE may determine that the new calculation reveals that the UE's speed has remained less than a threshold speed for at least a threshold amount of time. And in response to this determination, the UE may hand over to the new coverage area. In an embodiment in which the new RAN entity and new coverage area is a small cell, the determination that the UE's speed has remained less than a threshold speed for at least a threshold amount of time may indicate that the UE can hand over to the small cell without concern that the UE will contribute to excess signaling at the small cell. Other advantages are possible as well.

Also disclosed herein is a second method, which is also designed to help strike a balance between alleviating load among macro cells and reducing excessive signaling when UEs travel through small cells. In accordance with the second method, a first RAN entity may estimate the size of the first RAN entity's coverage area. Additionally, the first RAN entity may receive from a UE operating in the coverage area an indication of the UE's speed. Based on the estimated size of the coverage area and the indicated speed of the UE, the first RAN entity may determine that the first UE's speed exceeds a threshold speed. And in response to this determination, the first RAN entity may instruct the UE to handover to a second RAN entity.

In one example embodiment, the first RAN entity (and its corresponding coverage area) is a small cell and the second RAN entity (and its corresponding coverage area) is a macro cell. As described above, causing a UE to hand over from a small cell to a macro cell when the UE is traveling at a particular speed may mitigate excess signaling that the UE would have engaged in with other nearby small cells. Other advantages are also possible.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Figure 1:
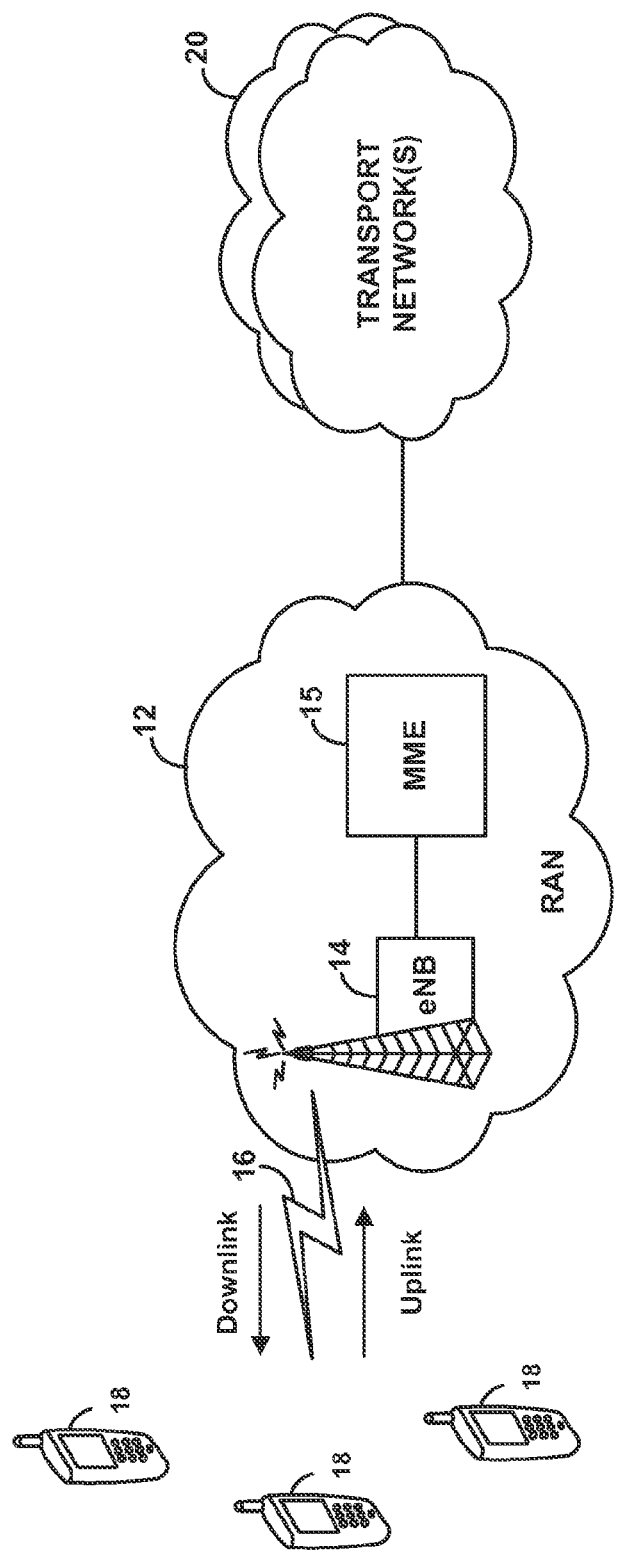
FIG. 1 depicts an example communication system, in which an example embodiment of the described arrangement can be implemented.

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another such non-transitory machine-readable medium.

At a general level, as shown in FIG. 1, the example wireless communications system includes at its core a RAN 12 having an eNodeB (eNB) 14, that radiates to define a wireless air interface 16 through which the eNB may communicate with at least one UE 18. The eNB 14 is in turn shown coupled to a Mobility Management Entity (MME) 16 that typically coordinates bearer setup and the tracking and paging of subscriber UEs operating in the RAN. RAN 12 then provides connectivity with one or more transport networks 20, such as the PSTN or the Internet for instance. With this arrangement, a UE 18 that is positioned within coverage of the base station and that is suitably equipped may engage in air interface communication with the base station and may thereby communicate with remote entities on the transport network(s) 20 and/or with other UEs served by the RAN.

At a more complex level, but still by way of example, the network architecture of RAN 12 may be configured to enable eNB 14 to communicate with UEs 18 over the air interface 16 according to one or more agreed air interface protocols, examples of which include Long Term Evolution (LTE) Code Division Multiple Access (CDMA), Universal Mobile Telecommunications System (UMTS), Wireless Interoperability for Microwave Access (WiMAX), IDEN, GSM, GPRS, EDGE, MMDS, WIFI, BLUETOOTH, and other protocols now known or later developed. For example, in a UMTS system configured to operate according to LTE standards, the base station is usually referred to as an eNodeB or an eNB. In a CDMA system configured to operate according to the IS-2000 standard (sometimes referred to as 1xRTT) or the IS-856 standard (sometimes referred to as 1xEV-DO), the base station is usually referred to as a Base Transceiver Station (BTS) and is usually under the control of a Base Station Controller (BSC). Other architectures and operational configurations of a RAN are possible as well.

As further shown in FIG. 1, the air interface 16 generally defines an uplink that carries wireless communications from the RAN 12 to the UEs 18 and a downlink that carries wireless communications from the UEs 18 to the RAN 12. Depending on the protocol, these links may be structured in various ways. At a high level, for instance, the eNB 14 may provide service on one or more frequency channels or bands, with downlink communications occupying one band and uplink communications occupying another band. Alternatively, downlink and uplink communications may be carried out on a common frequency band and may be differentiated through time division multiplexing and/or other techniques.

2. Example Network Device

Figure 2:
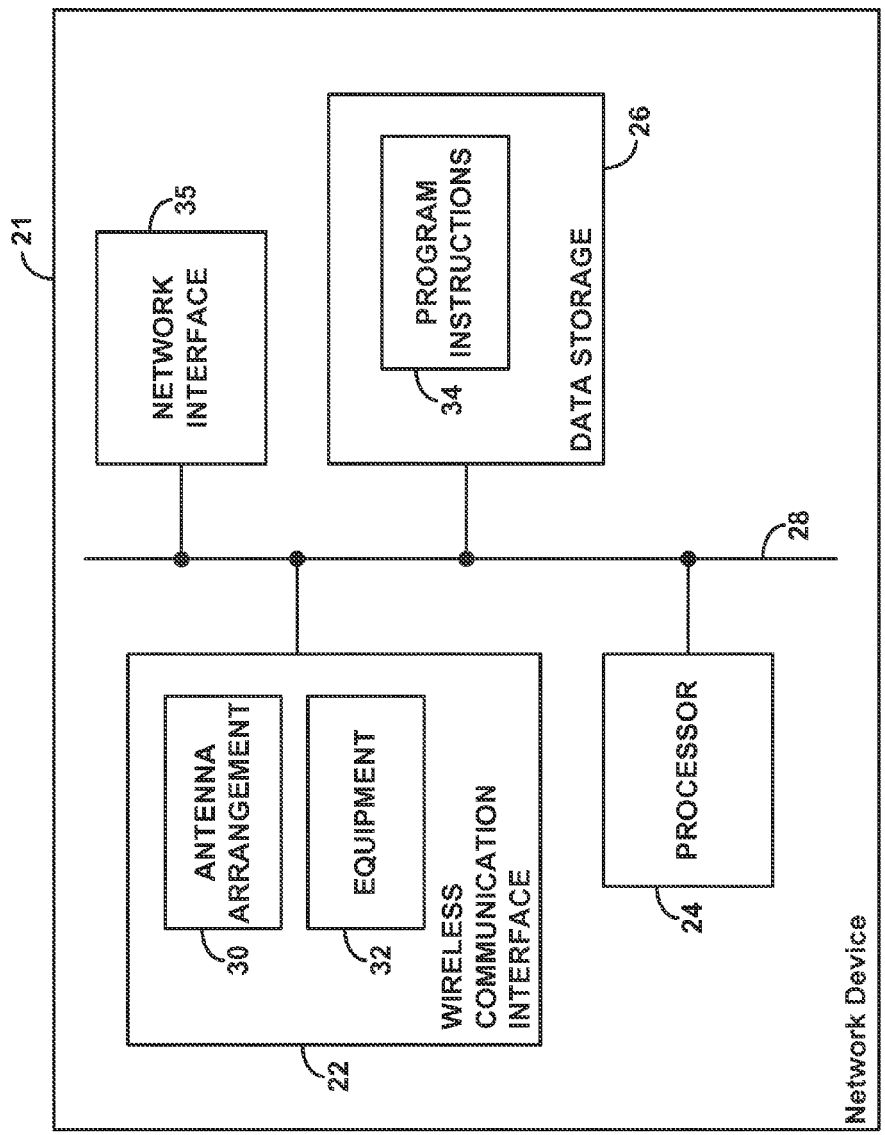
FIG. 2 depicts an example network device arranged to implement the present methods.

FIG. 2 is a simplified block diagram of an example network device 21 that may be configured to carry out network-side functions described herein. Network device 21 may be representative of an eNB (such as eNB 14), BTS, access node, access point, Node-B, femtocell, microcell, picocell, or some other entity that may be associated with RAN 12. As shown in FIG. 2, the network device may include a wireless communication interface 22, a processor 24, and data storage 26, all of which may be coupled together by a system bus, network or other connection mechanism 28.

As further shown, wireless communication interface 22 may include an antenna arrangement 30 and associated equipment 32, the combination of which may enable network device 21 to communicate with UEs (or perhaps other network devices) on a network such as RAN 12. For example, wireless communication interface 22 may enable network device 21 to transmit downlink communications to UEs, and receive uplink communication from UEs. Accordingly, the antenna arrangement 30 may be tower mounted (when the network device 21 is a macro cell, such as an eNB or BTS) or enclosed within a housing of network device 21 (when the network device 21 is a small cell, such as a femtocell, picocell, or microcell) and configured to radiate to define one or more wireless coverage sectors in which UE 18 operates. The equipment 32 may include a trunk, optical link, or any Ethernet network interface card or other physical connection that can be coupled with any other entity on the RAN 12 or transport network(s) 20. By way of example, the equipment 32 may include a module, such as an CSM-series chipset made by Qualcomm Inc. of San Diego, Calif., and may support wireless packet-data communications according to a CDMA family of protocols. Other modules that support others communications protocols are possible as well.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components, such as a non-transitory computer-readable medium, and may be integrated in whole or in part with processor 24. Some examples of non-transitory computer-readable media include a hard disk drive, a Compact Disc (CD), a Digital Video Disk (DVD), a digital tape, flash memory, although others are possible.

As shown, network device 21 may also include a network interface 35. Network interface 35 may generally be any wired (e.g., Ethernet) or wireless (e.g., Wi Fi) interface over which the network device can transmit and receive data with another entity. In examples in which the network device 21 is a macro cell base station, the network interface 35 may be configured to communicate with other macro cell base stations, small cell base stations, other MMEs, and/or other network entities. In examples in which the network device 21 is a small cell base station, the network interface 35 may be configured to communicate with a home router, and thus to the Internet and/or one or more other packet-data networks. The small cell base station may establish via the network interface 35 a virtual-private-network (VPN) connection over the Internet with an entity (e.g., a VPN terminator) on the wireless service provider's core network. In this case, the small cell base station may then securely communicate with the VPN terminator and thereby communicate with other entities on the core network.

As further shown, data storage 26 may hold program instructions 34, which may be executable by processor 24 to carry out various base station or RAN 12 functions described herein. For instance, in accordance with the program instructions 34, the processor 24 may function to estimate the size of a coverage area, receive an indication of the current speed of a UE traveling through the coverage area, determine that the calculated speed exceeds a threshold speed, and responsively instruct the UE to hand over to a different RAN.

As such, the processor 24 programmed with instructions 34 may define part or all of a controller for controlling operation of the network device 21. Alternatively or additionally, however, such control functionality could be provided external to the network device 21, such as within some other entity not shown but associated with RAN 12 or transport network(s) 20 in FIG. 1. Such an entity may be communicatively linked with the network device 21 and could serve to control aspects of the network device 21 and RAN operation generally.

By way of example, in embodiments in which network device 21 is a small cell (e.g., a femtocell, picocell, microcell, or another type of device), the small cell may be approximately the size of a desktop phone or WiFi access point, although the small cell may take various forms. As such, the small cell may be a low-power, low-capacity version of a macro cell base station. Additionally, the small cell may use a general power outlet, perhaps with a transformer providing a DC power supply.

The small cell may also utilize the wireless communication interface 22 to wirelessly communicate with mobile devices according to wireless protocols such as CDMA, LTE, and the like. The small cell may thus act as a micro base station to provide local wireless coverage on the macro-network provider's network via the user's Internet connection. Further, the small cell may provide service on a single carrier frequency (or on a single carrier frequency per technology, where multiple technologies, such as CDMA and EV-DO, are supported). The small cell may also transmit a pilot beacon that includes administrative messages and parameters that UEs can use to connect with the small cell. The pilot beacon may include information to facilitate a handover of a UE from a macro cell to the small cell. To inform UEs of the small cell, the pilot beacon may be transmitted on one or more of the macro-network carrier frequencies on which the wireless service provider provides service in that area.

3. Example User Equipment

Figure 3:
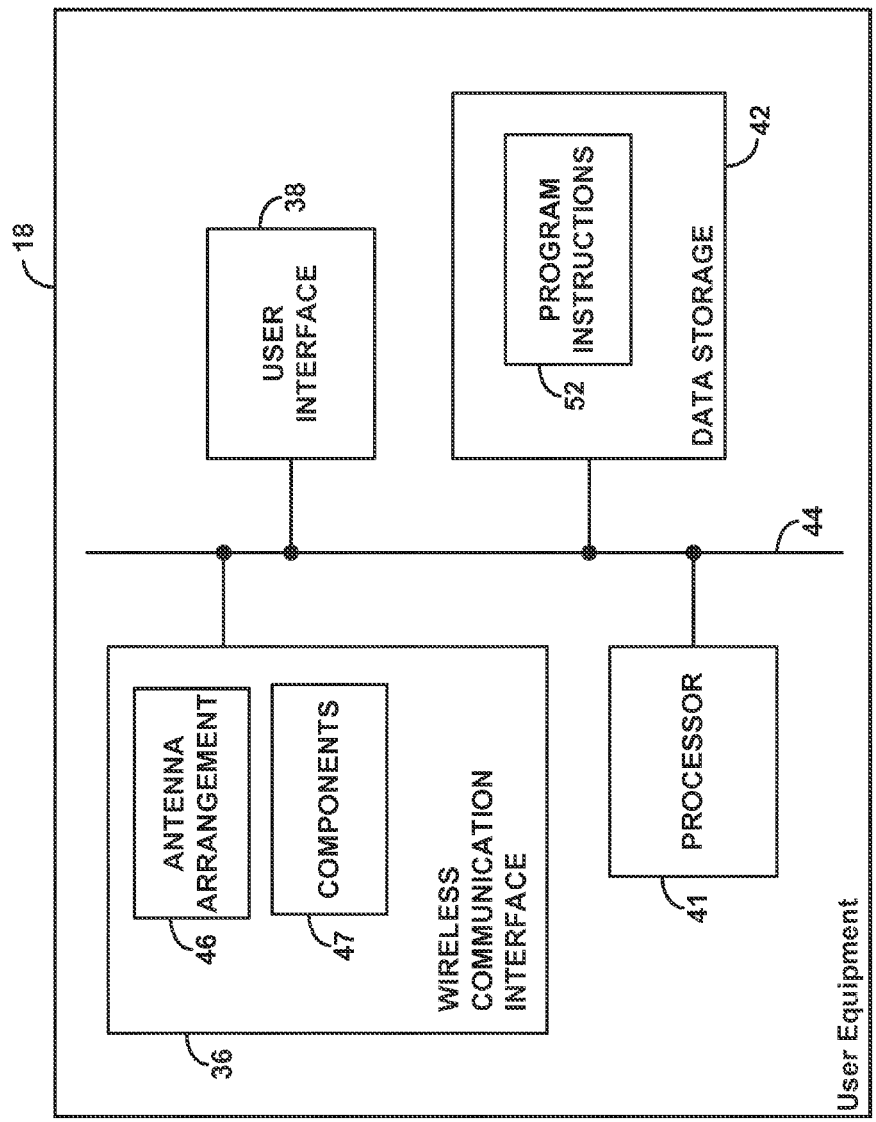
FIG. 3 depicts an example user equipment arranged to implement the present methods.

FIG. 3 is a simplified block diagram of a representative UE 18 (also possibly referred to as a mobile station, access terminal, a wireless communication device, or the like), such as a cellular telephone, wirelessly equipped tablet or personal computer, embedded wireless communication module, for instance. As shown, the representative UE may include a wireless communication interface 36, a user interface 38, a processor 41, and data storage 42, all of which may be coupled together by a system bus, network, or other connection mechanism 44.

Wireless communication interface 36 may comprise an antenna arrangement 46 and associated components 47, for engaging in communication with serving base stations, such as to transmit data and control information to the base stations and to receive data and control information from the base stations. For instance, the components 47 may include a mobile station modem, such as an MSM-series chipset made by Qualcomm Inc. However, other modules that support other protocols are possible as well.

User interface 38 may facilitate interaction with a user of the UE if applicable. As such, the user interface may include output components such as a display screen, loudspeaker, and headphone jack, and input components such as a keypad, a touch-sensitive screen, and a camera.

Processor 41 may comprise one or more general purpose processors and/or special-purpose processors and may be integrated in whole or in part with wireless communication interface 36. Data storage 42 may comprise one or more volatile and/or non-volatile storage components, such as a non-transitory computer-readable medium, and may be integrated in whole or in part with processor 41. Some examples of non-transitory computer-readable media include a hard disk drive, a Compact Disc (CD), a Digital Video Disk (DVD), a digital tape, flash memory, although others are possible. As shown, data storage 42 may hold program instructions 52, which may be executable by processor 41 to carry out various UE functions described herein.

For instance, in one embodiment of the present disclosure, the program instructions 52 may be executable by processor 41 to carry out functions including receiving an indication of the size of a coverage area, calculating the current speed of the UE 18, determining that the calculated speed exceeds a threshold level of speed, and responsively handing over to a new base station.

In another embodiment of the present disclosure, the program instructions 52 may be executable by processor 41 to carry out functions including receiving an indication of the size of a second RAN entity's coverage area while being served by a first RAN entity, calculating a current speed of the UE 18, determining that the calculated speed exceeds a threshold level speed, and responsively traveling through the second RAN entity's coverage area without handing over to the second RAN entity.

4. Example Handover Technique

Figure 4:
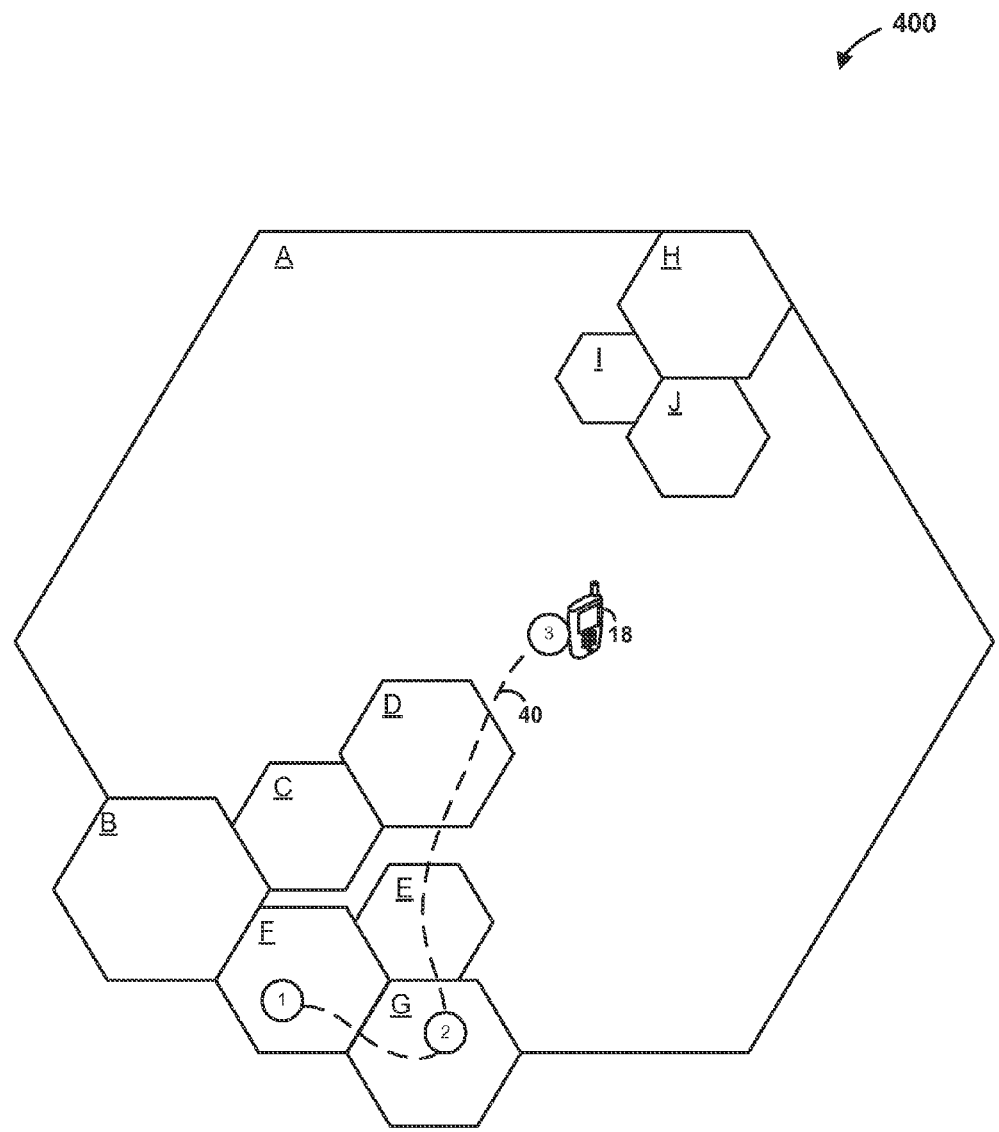
FIG. 4 depicts an example arrangement of coverage areas in which the present methods can be implemented.

FIG. 4 is a block diagram depicting example wireless coverage areas 400, which form a portion of a wireless network. As shown in FIG. 4, the example coverage areas include ten wireless coverage sectors A-J, of which sector A is a macro cell and sectors B-J are small cells with coverage areas that overlap at least in part with macro cell A. In addition to these sectors, the wireless network may include additional sectors (not shown), which may be small cells or macro cells. Each sector depicted in FIG. 4 is generally defined by radiation of an antenna arrangement of a respective eNB or other device, such as a femtocell, microcell, or a picocell, all of which are hereafter referred to as base station for brevity. Additionally, although each sector A-J is shown as being roughly hexagonal, in practice, wireless coverage sectors may be circular, oval, or any other shape.

As mentioned above, UEs traveling through clusters of small cells may engage in excess signaling leading to congestion among those small cells. For instance, as depicted in FIG. 4, consider a scenario where a UE 18 travels along a path 40, originating at location 1 in small cell F and passing through small cells G, E, and D. In practice, upon entering the coverage of each new small cell G, E, and D, UE 18 would typically exchange a series of access messages (or another type of registration or location-update signaling) with the respective base station of each new small cell G, E, and D, in turn. This signaling, especially when multiplied many times over for other traveling UEs (not shown), may tend to burden the network.

In accordance with one method designed to help alleviate this type of excess signaling, as the UE 18 travels along path 40 and enters into coverage of small cell G, UE 18 may receive from a RAN entity an indication of the size of small cell G. In some embodiments of the method, UE 18 may receive this indication from the base station of small cell G as a system parameter broadcast by the base station on an overhead channel, for instance. However, in other embodiments, UE 18 may receive the indication from another RAN entity, such as the base station of small cell F or the base station of macro cell A. By way of example, this indication may reveal that the size of small cell G is about 500 feet in diameter. However, other sizes and other ways to indicate coverage area size are possible (e.g., in feet or meters, whether by diameter, radius, or total area).

After receiving the indication of the size of small cell G (or perhaps sometime before receiving it), UE 18 will also calculate its current speed. According to one embodiment, UE 18 may calculate its current speed by measuring the time it took to travel a known distance. For instance, with the aid of a GPS module or some other location-detection mechanism, UE 18 may estimate the distance between location 1 and location 2 along the UE's path 40 and determine that distance to be about 550 feet. UE 18 may also have determined that it took approximately 15 seconds to traverse that path. Accordingly, UE 18 may determine that its current speed is about 37 feet per second (about 25 mph). However, other ways to calculate speed are possible as well.

After calculating the UE's current speed, the UE may determine that the calculated speed exceeds a threshold speed. In some embodiments of the method, the threshold speed is a constant value, such as 10 feet per second (although other speeds are possible). However, in other embodiments of the method, the threshold speed is based on the indicated size of the particular coverage area.

For instance, in one example embodiment, the threshold speed may be a speed at which a UE would spend about 30 seconds in the coverage area. To determine whether the UE is traveling at a speed that exceeds a speed at which the UE would spend about 30 seconds in the coverage area, the UE may first carry out a calculation to determine the threshold speed at which the UE would spend about 30 seconds in the coverage area. And second, the UE may compare the UE's calculated speed to the determined threshold speed. To carry out this calculation for a particular coverage area, the UE may divide the size of the particular coverage area by 30 seconds. However, in other embodiments, the threshold speed may a speed at which the UE would spend 45 seconds, 60 seconds, 90 seconds, or any other amount of time in the particular coverage area.

For example, in the example described above, the indicated size of coverage area G is about 500 feet in diameter. Therefore, UE 18 may carry out this calculation by dividing 500 feet by 30 seconds, thereby yielding a threshold speed of about 17 feet per second (about 12 mph). Per the calculation, 17 feet per second is the speed of a UE at which the UE would spend about 30 seconds in coverage area G.

In the example described above, UE 18 may determine that the UE's calculated speed exceeds the threshold speed because 37 feet per second is greater than 17 feet per second. And in accordance with the method, in response to making this determination, the UE 18 may hand over to a macro cell base station of which the UE is currently in coverage (e.g., macro cell A). In order to do this, the UE 18 may scan for coverage of a macro cell base station at the UE's current location and hand over to whichever macro cell base station has the strongest detected signal. To assist UEs in determining whether a particular base station is a macro cell or a small cell, the particular base station may broadcast on an overhead channel an identifier that indicates to UEs whether the particular base station is a macro cell or a small cell. Alternatively, UEs may maintain a list, such as a neighbor scan list, that indicates which sectors of a RAN are macro cells and which sectors are small cells. UEs may refer to such a list when scanning for coverage of a macro cell to hand over to. However, other ways of determining whether a particular base station is a macro cell or a small cell may be possible as well.

As described briefly above, handing over to a macro cell when a UE is traveling at a certain speed may help that UE to avoid excess signaling with other small cells. For instance, as depicted in FIG. 4, as UE 18 travels along path 40, it travels through small cells G, E, and D. By handing over to macro cell A at location 2, the UE may avoid excess registration signaling in small cells E and D on its way to location 3.

As described above, UE 18 may be arranged to prefer small cells over macro cells, and as a such, when UE 18 hands over from a small cell to a macro cell, UE 18 may be inclined to immediately hand back over to the small cell. To help prevent UE 18 from immediately handing back over to a small cell, UE 18 may temporarily amend its neighbor scan list so that UE 18 prefers the macro cell over the small cells. As mentioned, the neighbor scan list may describe a preferred priority order of sectors in which UE 18 should operate. According to one embodiment of the method, after UE 18 hands over to the macro cell of which it is currently in coverage (e.g., macro cell A), UE 18 may also temporarily amend the UE's neighbor scan list so that the UE 18 does not immediately hand back over to a small cell (e.g., small cell G). For instance, UE 18 may reorder the neighbor scan list so that macro cell A is listed higher than the other small cells B-J. However, other ways to help prevent UE 18 from immediately handing back over to a small cell are possible as well.

Figure 5:
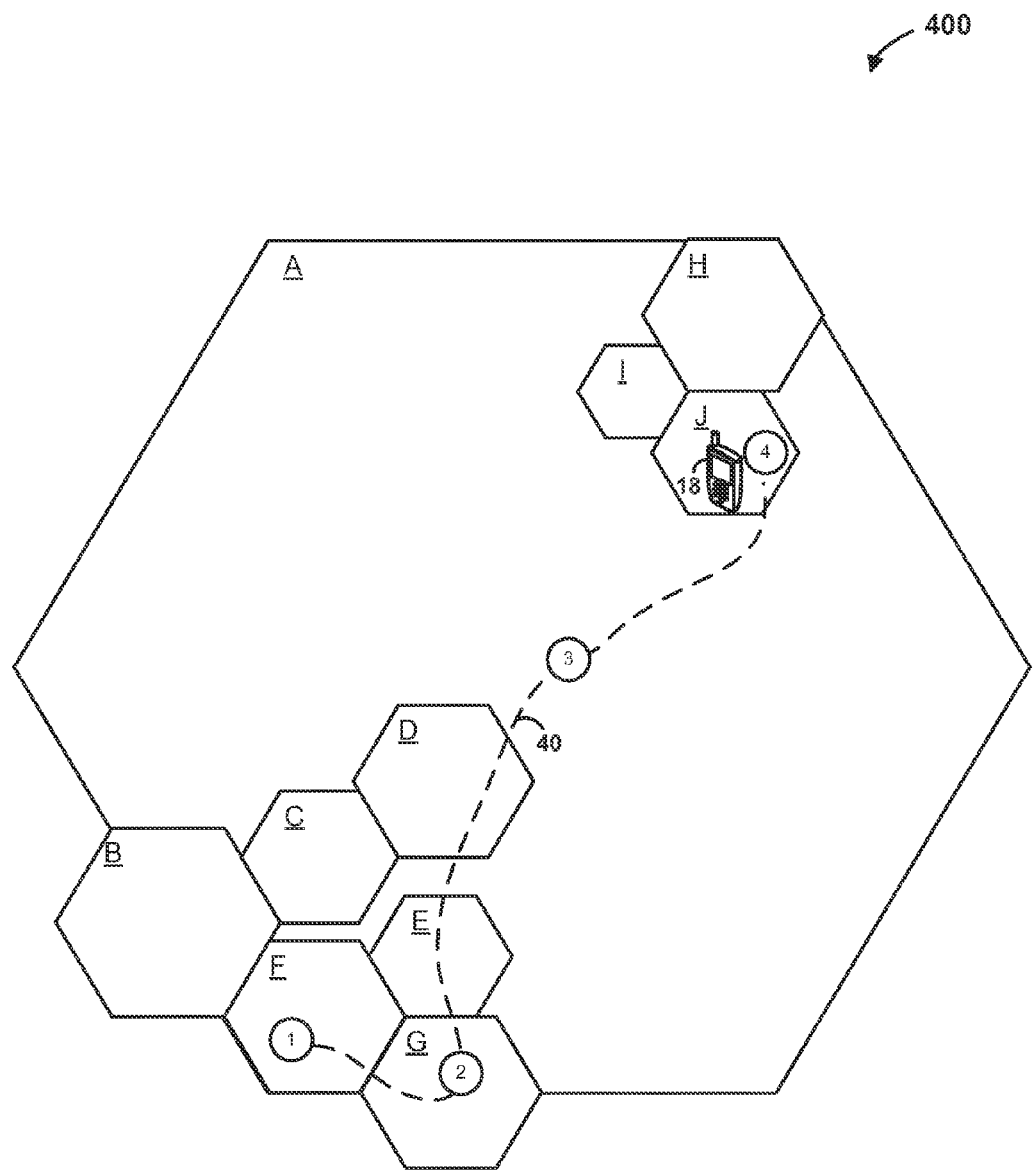
FIG. 5 depicts an example arrangement of coverage areas in which the present methods can be implemented.

FIG. 5 depicts the position of UE 18 in wireless coverage areas 400 after UE 18 has moved to location 4. In another embodiment of the method, when UE 18 comes into coverage of a new small cell, say small cell J, UE 18 may receive from another RAN entity (e.g., the base station of small cell J) an indication of the size of small cell J. By way of example, this indication may reveal that the size of small cell J is about 300 feet in diameter. Similar to that described above with respect to FIG. 4, in some embodiments, UE 18 may receive this indication from the base station of small cell J as a system parameter broadcast by the base station on an overhead channel, for instance. However, in other embodiments, UE 18 may receive the indication from another RAN entity, such as the base station of macro cell A.

After receiving the indication of the size of small cell J (or perhaps sometime before receiving it), UE 18 will also recalculate its current speed. Similar to that described above with respect to FIG. 4, according to one embodiment, UE 18 may calculate its current speed by measuring the time it took to travel a known distance. For instance, with the aid of a GPS module or some other location-detection mechanism, UE 18 may estimate the distance between location 3 and location 4 along the UE's path 40 and determine that distance to be about 1000 feet. UE 18 may also have determined that it took approximately 45 seconds to traverse that path. Accordingly, UE 18 may determine that its current speed is about 22 feet per second (about 15 mph). However, other ways to calculate speed are possible as well.

In accordance with the method, UE 18 may then determine whether this recalculated speed exceeds a threshold speed. Similar to that described above with respect to FIG. 4, the threshold speed may be a speed at which a UE would spend about 30 seconds in the coverage area. To determine whether the UE is traveling at a speed that exceeds a speed at which the UE would spend about 30 seconds in the coverage area, the UE may first carry out a calculation to determine the threshold speed at which the UE would spend about 30 seconds in the coverage area. And second, the UE may compare the UE's calculated speed to the determined threshold speed.

In this example, the size of small cell J is about 300 feet in diameter. Therefore, the UE 18 may divide 300 feet by 30 seconds, thereby yielding a threshold speed of 10 feet per second. Accordingly, the UE 18 may determine that the UE's recalculated speed exceeds the threshold speed because 22 feet per second is greater than 10 feet per second. And in accordance with the method, in response to making this determination, the UE may travel through the coverage of small J without handing over to small cell J. Again, the threshold speeds described herein are for illustration purposes; in other embodiments of the method, other threshold speeds and other ways to calculate a threshold speed are possible.

Figure 6:
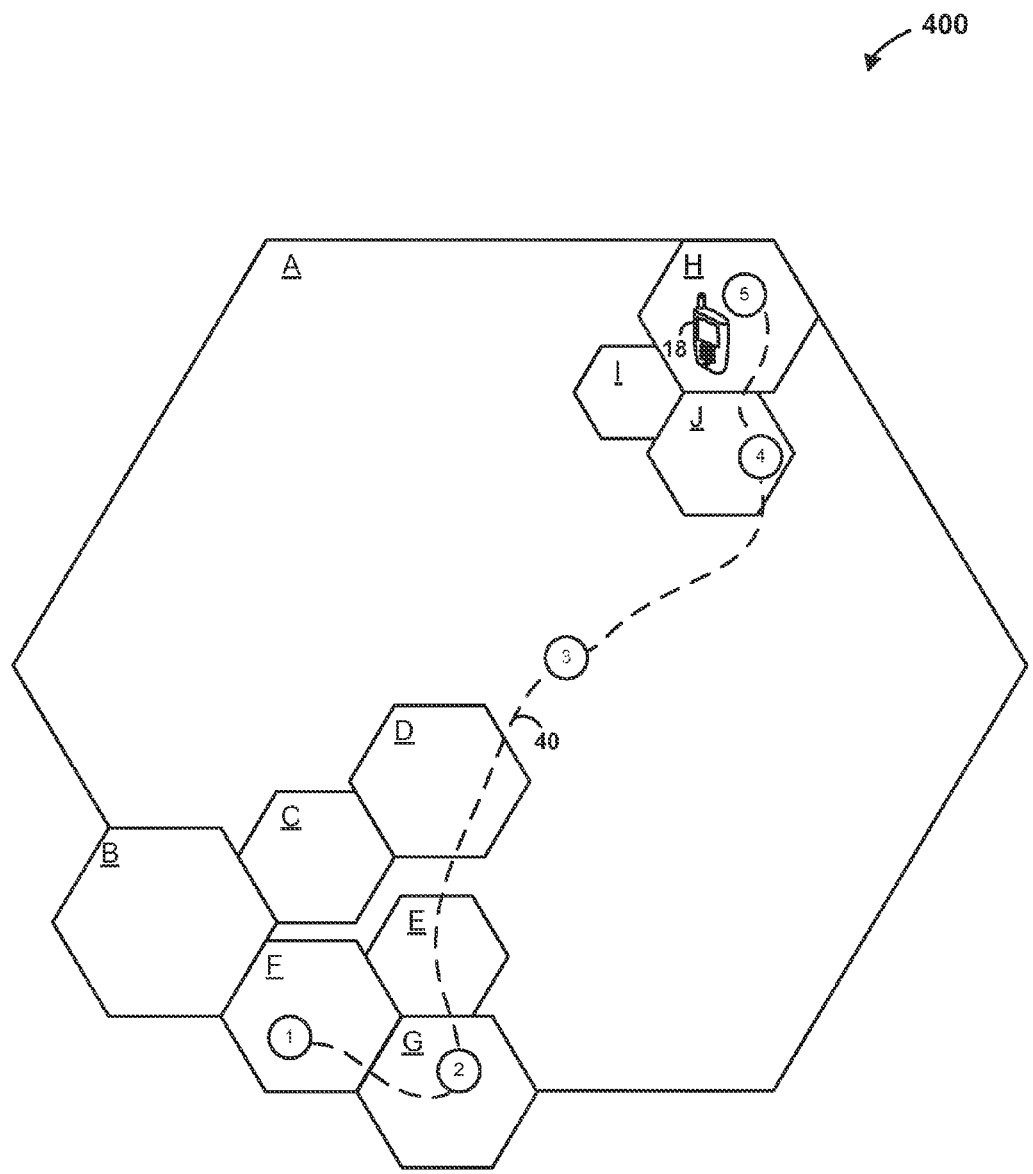
FIG. 6 depicts an example arrangement of coverage areas in which the present methods can be implemented.

FIG. 6 depicts the position of UE 18 in sectors 400 after UE 18 has moved to location 5. In accordance with the method, when UE 18 comes into coverage of a new small cell, say small cell H, UE 18 may again receive from another RAN entity (e.g., the base station of small cell H) an indication of the size of small cell H. By way of example, this indication may reveal that the size of small cell H is about 500 feet in diameter. Similar to that described above with respect to FIGS. 4 and 5, in some embodiments, UE 18 may receive this indication from the base station of small cell H as a system parameter broadcast by the base station on an overhead channel, for instance. However, in other embodiments, UE 18 may receive the indication from another RAN entity, such as the base station of macro cell A.

After receiving the indication of the size of small cell H (or perhaps sometime before receiving it), UE 18 will also recalculate its current speed. Similar to that described above with respect to FIGS. 4 and 5, according to one embodiment, UE 18 may calculate its current speed by measuring the time it took to travel a known distance. For instance, with the aid of a GPS module or some other location-detection mechanism, UE 18 may estimate the distance between location 4 and location 5 along the UE's path 40 and determine that distance to be about 300 feet. UE 18 may also have determined that it took approximately 100 seconds to traverse that path. Accordingly, UE 18 may determine that its current speed is about three feet per second. However, other ways to calculate speed are possible as well.

In accordance with the method, UE 18 may then determine whether this recalculated speed exceeds a threshold speed. Similar to that described above with respect to FIGS. 4 and 5, the threshold speed may be a speed at which a UE would spend about 30 seconds in the coverage area. To determine whether the UE is traveling at a speed that exceeds a speed at which the UE would spend about 30 seconds in the coverage area, the UE may first carry out a calculation to determine the threshold speed at which the UE would spend about 30 seconds in the coverage area. And second, the UE may compare the UE's calculated speed to the determined threshold speed.

In this example, the size of small cell H is about 300 feet in diameter. Therefore, the UE 18 may divide 300 feet by 30 seconds, thereby yielding a threshold speed of 10 feet per second. Accordingly, the UE 18 may determine that the UE's recalculated speed is less than the threshold speed because three feet per second is less than 10 feet per second. And in accordance with the method, in response to making this determination, the UE may hand over to the small cell H at location 5. As described above, the determination that the UE's speed is less than a threshold speed may indicate that the UE can handover to the small cell without concern that the UE will contribute to excess signaling among nearby small cells.

In some embodiments of the method, the UE may not hand over to the small cell until it determines that the UE's recalculated speed has remained below the threshold speed for a threshold period of time (e.g., two minutes). In these embodiments, this waiting period may serve to delay the handover in case the UE begins traveling at or above the threshold speed again. This may be the case when the UE is temporarily stopped in traffic, or for other reasons.

In embodiments of the method in which the UE 18 has temporarily amended its neighbor scan list to prefer macro cells over small cells, such as in the example embodiment described above, the UE 18 may also undo any such temporary amendment to its neighbor scan list so that the UE 18 does not immediately hand back over to the macro cell. For instance, UE 18 may reorder the neighbor scan list so that macro cell A is listed below small cell H as well as perhaps the other small cells B-J. Other ways to help prevent UE 18 from immediately handing back over to the macro cell are possible as well.

Figure 7:
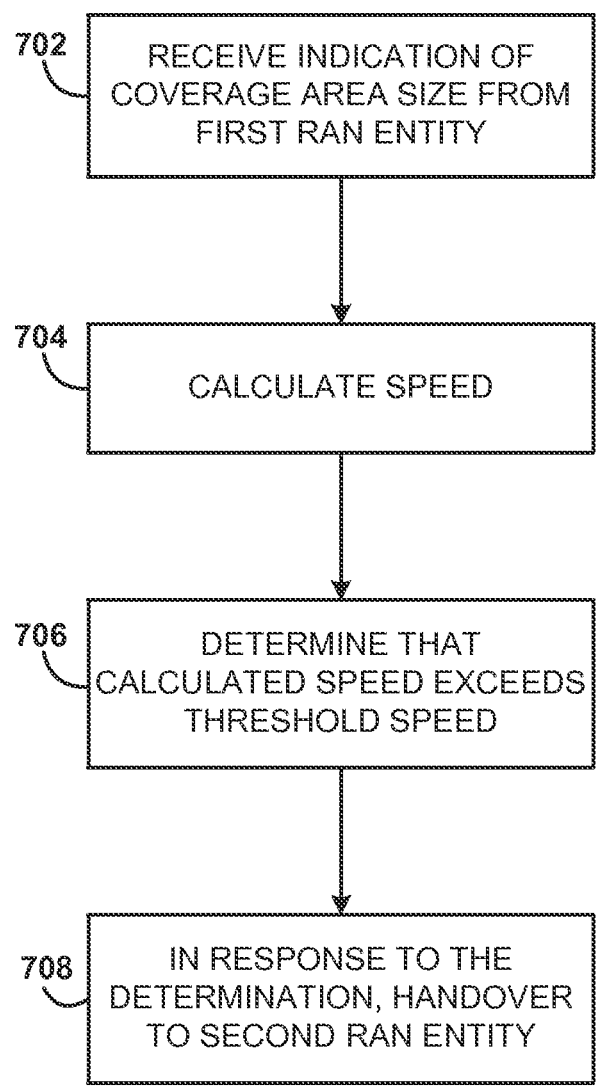
FIG. 7 is a flowchart depicting functions that can be carried out in accordance with the present methods.
Figure 8:
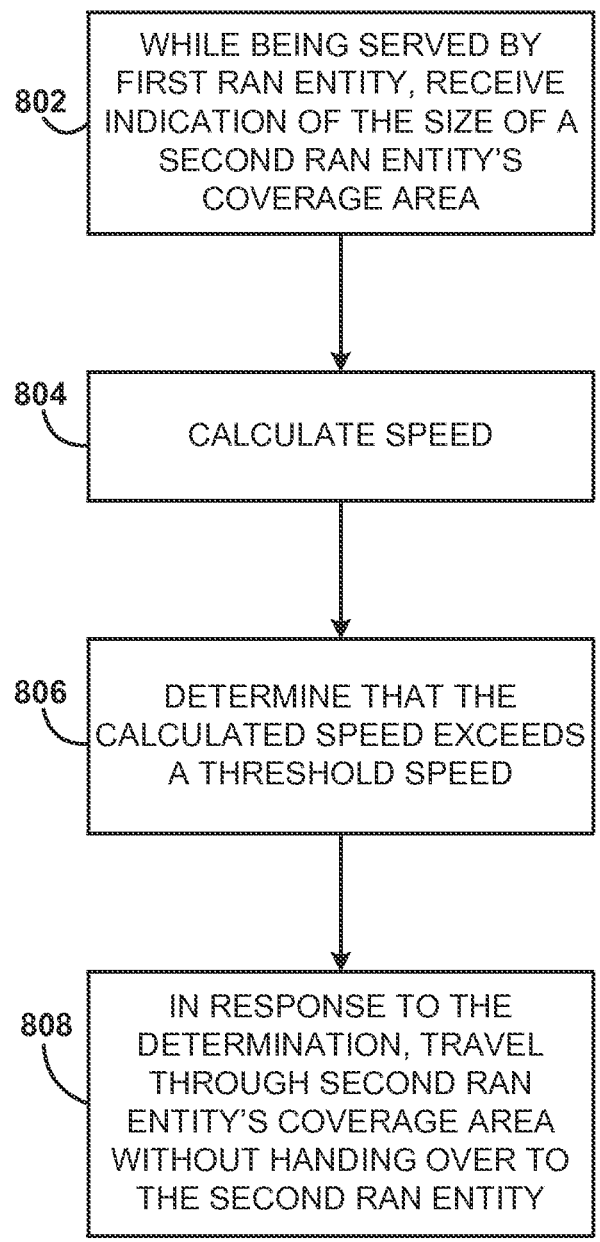
FIG. 8 is a flowchart depicting functions that can be carried out in accordance with the present methods.

FIGS. 7 and 8 are flowcharts depicting functions that can be carried out by a UE, in accordance with at least one embodiment of the description set forth above. The process depicted in FIG. 7, for instance, begins at step 702, where a UE receives an indication of coverage area size from a first RAN entity. For example, as described above, in some embodiments, a UE may receive an indication of the size of a coverage area from a base station in that coverage area. In other embodiments, the UE may receive an indication of the size of a coverage area from another base station.

The process continues at block 704 where the UE calculates its speed. For example, as described above, the UE may calculate its speed by measuring the amount of time it took to travel a known distance. However, other ways to calculate speed are possible as well.

Continuing at block 706, the UE determines that the calculated speed exceeds a threshold speed. For example, as described above, the threshold speed may be a speed at which a UE will spend 30 seconds or less in the coverage area. Accordingly, if the coverage area is 300 feet in diameter, the threshold speed would be 10 feet per second. However, other examples of threshold speed are possible as well.

Finally at block 708, in response to the determination of block 706, the UE hands over to a second RAN entity. As described above, in some embodiments, the second RAN entity is a macro cell, whereas the first RAN is a small cell. However, other configurations are possible as well.

Turning to FIG. 8, the process depicted in FIG. 8 begins at step 802 where while a UE is being served by a first RAN entity, the UE receives an indication of the size of a second RAN entity's coverage area. As indicated above, the first RAN entity may be a base station of a macro cell, whereas the second RAN entity may be a base station of a small cell. However, other configurations are possible as well. In one example embodiment, a UE may receive an indication of the size of a coverage area from a base station in that coverage area. In other embodiments, the UE may receive an indication of the size of a coverage area from another base station.

At block 804, the UE may calculates it current speed. For example, as described above, the UE may calculate its speed by measuring the amount of time it took to travel a known distance. However, other ways to calculate speed are possible as well.

Continuing at block 806, UE determines that the calculated speed exceeds a threshold speed. For example, as described above, the threshold speed may be a speed at which a UE will spend 30 seconds or less in the coverage area. In an example in which the coverage area is 300 feet in diameter, the threshold speed would be 10 feet per second. However, other examples of threshold speed are possible as well.

Finally, at block 808, in response to the determination of block 806, the UE travels through the second RAN entity's coverage area without handing over to the second RAN entity. As indicated above, in embodiments in which the second RAN entity is a base station of a small cell, traveling through coverage of the small cell without handing over to the small cell may help prevent the UE from engaging in excess signaling among the small cells.

Figure 9:
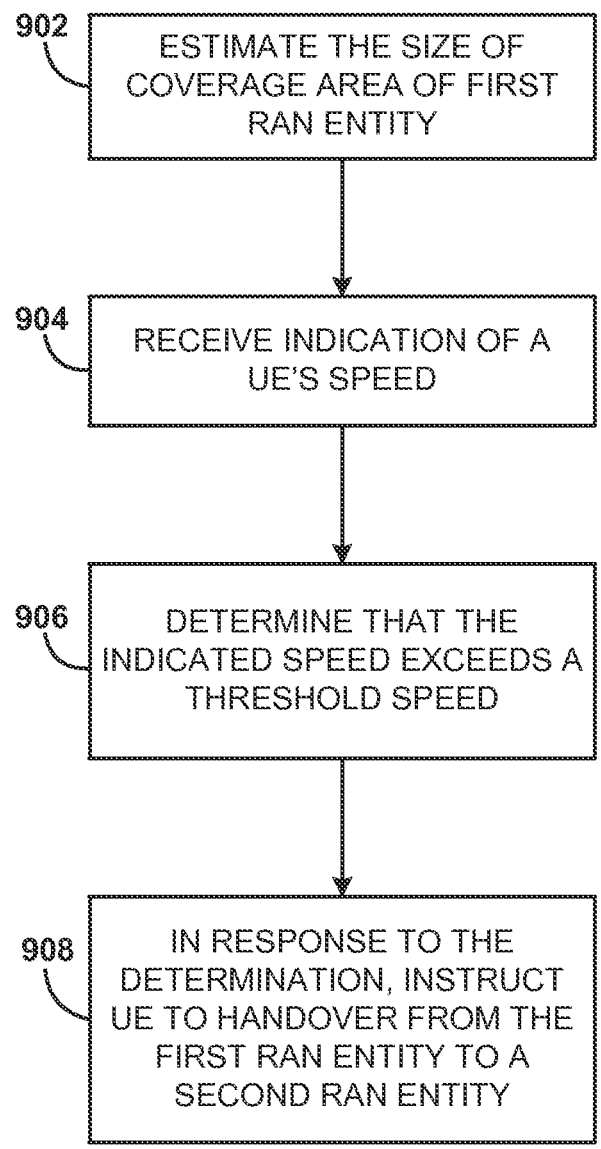
FIG. 9 is a flowchart depicting functions that can be carried out in accordance with the present methods.

FIG. 9 depicts a process in which some of the steps of the present method are carried out at a RAN entity (such as a base station of a macro cell or a small cell). As depicted, FIG. 9 begins at step 902 where a RAN entity (such as a base station of a small cell) estimates the size of its coverage area. To do this, the RAN entity may estimate the transmission power of the RAN entity's pilot signal or reference signal. The RAN entity may then relate the estimated transmission power of the pilot signal to a particular propagation distance. For instance, the RAN entity may be provisioned with a lookup table that lists example propagation distances for example pilot signal transmission powers. Accordingly, the RAN entity may compare the estimated transmission power level to the example transmission power levels listed in the lookup table in order to estimate the propagation distance of the RAN entity's pilot signal. The RAN entity may then determine that the estimated propagation distance is a radius of the RAN entity's coverage area.

Alternatively, the RAN entity may compare the location of the RAN entity to the locations of various UEs operating in coverage of the RAN entity. As a result of comparing the locations, the RAN entity may identify a particular UE that is the farthest distance away from the RAN entity. Accordingly, the RAN entity may determine this distance to be the radius of the RAN entity's coverage area. Other ways of estimating the size of coverage areas are possible as well.

The process continues at block 904 where the RAN entity receives an indication of a UE's speed. According to one embodiment, a UE may estimate its own speed and transmit the estimation to the RAN entity. However, other ways of receiving an indication of a UE's speed are possible.

Continuing at block 906, the RAN entity may determine that the indicated speed of the UE exceeds a threshold speed. The RAN entity may compare the received indication of the UE's speed to the threshold speed to determine whether the UE's speed exceeds the threshold speed. For example, similar to that discussed above, the threshold speed may be a speed at which a UE will spend 30 seconds or less in the coverage area.

In an example in which the coverage area is 300 feet in diameter, the threshold speed would be 10 feet per second. However, other examples of threshold speed are possible as well.

Finally, at block 908, in response to the determination of block 906, the first RAN entity instructs the UE to hand over to second RAN entity. In some embodiments, the second RAN entity is a macro cell, whereas the first RAN entity is a small cell. And as described above, handing over from a small cell to a macro cell when the UE is traveling at a particular speed may mitigate excess signaling that the UE would have engaged in with other nearby small cells.

5. Conclusion

Various embodiments have been described above. Those skilled in the art will understand, however, that changes and modifications may be made to these embodiments without departing from the scope of the claims.

We claim:

1. In a wireless communication system in which a user equipment (UE) is being served by a first radio access network (RAN) entity, the first RAN entity having a respective coverage area, a method comprising:
    the UE receiving from the first RAN entity an indication of a size of the first RAN entity's coverage area;
    the UE calculating the UE's speed;
    the UE determining that the calculated speed exceeds a threshold speed, the threshold speed being based on the size of the first RAN entity's coverage area;
    in response to the UE determining that the calculated speed exceeds a threshold speed, the UE handing over to a second RAN entity;
    after the UE handing over to the second RAN entity, the UE entering a coverage area of a third RAN entity and receiving from the third RAN entity an indication of a size of the third RAN entity's coverage area;
    the UE conducting an additional calculation of the UE's speed;
    the UE determining that the additional calculation of the UE's speed indicates that the UE's speed has remained less than a second threshold speed for at least a threshold amount of time, the second threshold speed being based on the size of the third RAN entity's coverage area; and
    in response to determining that the additional calculation of the UE's speed indicates that the UE's speed is less than a second threshold speed, the UE handing over to the third RAN entity.

2. The method of claim 1, wherein the UE determining that the calculated speed exceeds a threshold speed comprises the UE estimating that, based on the UE's calculated speed, the UE will be in coverage of the first RAN entity for less than a threshold amount of time.

3. The method of claim 1, wherein the second RAN entity has a coverage area that is larger than the first RAN entity's coverage area.

4. The method of claim 1, wherein the first RAN entity is a small cell base station and the second RAN entity is a macro cell base station.

5. The method of claim 1, further comprising:
    the UE reordering a neighbor list maintained at the UE such that the first RAN entity is listed in the neighbor list with lower priority than the second RAN entity.

6. The method of claim 1, wherein the UE determining that the additional calculation of the UE's speed indicates that the UE's speed is less than the second threshold speed comprises:
    the UE estimating that, based on the additional calculation of the UE's speed, the UE will be in coverage of the third RAN entity for greater than a threshold amount of time.

7. A first radio access network (RAN) entity arranged to operate in a wireless communication system that includes a second RAN entity, wherein the first RAN entity is serving a first user equipment (UE), the first RAN entity having a respective coverage area, the first RAN entity comprising:
    a non-transitory computer readable medium (CRM);
    at least one processor; and
    instructions stored on the CRM and executable by the at least one processor for carrying out functions, the functions including:
        the first RAN entity estimating a size of the first RAN entity's coverage area;
        the first RAN entity receiving from the first UE an indication of the first UE's speed;
        the first RAN entity determining that the first UE's speed exceeds a threshold speed, the threshold speed being based on the estimated size of the first RAN entity's coverage area;
        in response to the first RAN entity determining that the first UE's speed exceeds a threshold speed, the first RAN entity instructing the first UE to handover to a second RAN entity;
        the first RAN entity receiving from a second UE an indication of the second UE's speed;
        the first RAN entity determining that the second UE's speed is less than the threshold speed, the threshold speed being based on the estimated size of the first RAN entity's coverage area, wherein the first RAN entity determining that the second UE's speed is less than a threshold speed comprises the first RAN entity estimating that, based on the second UE's speed, the second UE will be in coverage of the first RAN entity for greater than a threshold amount of time; and
        in response to the first RAN entity determining that the second UE's speed is less than a threshold speed, the first RAN entity serving the second UE.

8. The first RAN entity of claim 7, wherein the first RAN entity determining that the first UE's speed exceeds a threshold speed comprises:
    the first RAN entity estimating that, based on the first UE's speed, the first UE will be in coverage of the first RAN entity for less than a threshold amount of time.

9. The first RAN entity of claim 7, wherein the second RAN entity has a coverage area that is larger than the first RAN entity's coverage area.

10. The first RAN entity of claim 7, wherein the first RAN entity is a small cell base station and the second RAN entity is a macro cell base station.

* * * * *